Aug. 8, 1939.   H. A. S. HOWARTH   2,168,343
LUBRICATING MEANS FOR THRUST BEARINGS
Filed Feb. 24, 1937   10 Sheets-Sheet 5
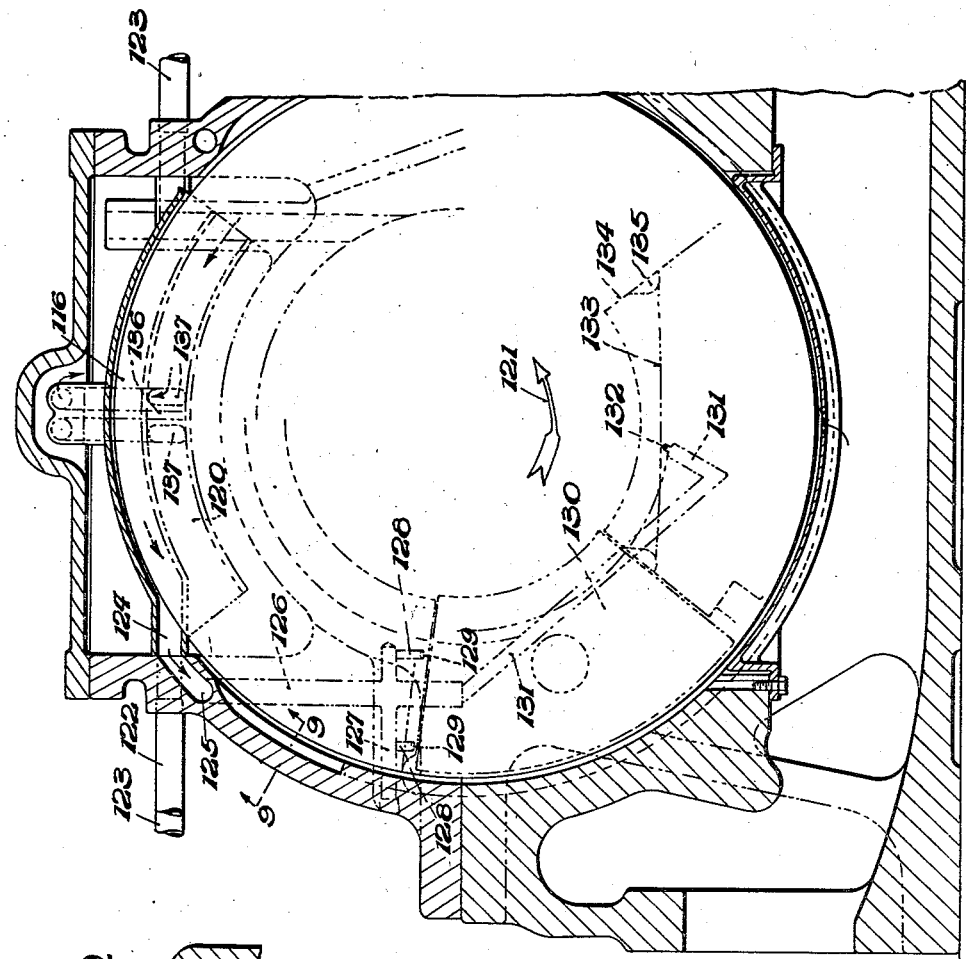
Inventor
Harry A. S. Howarth.
By Cameron, Kerkam & Sutton
Attorneys

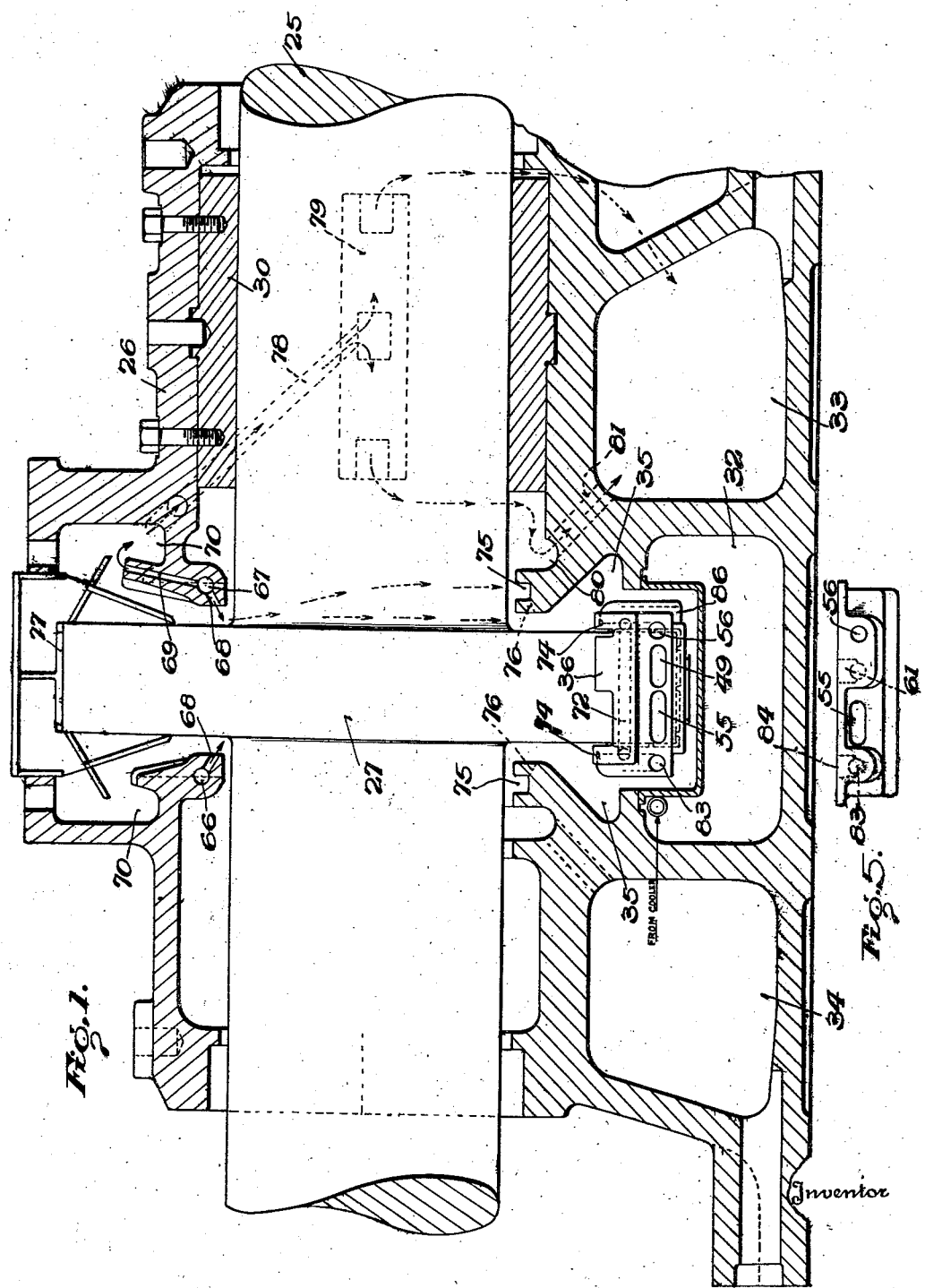

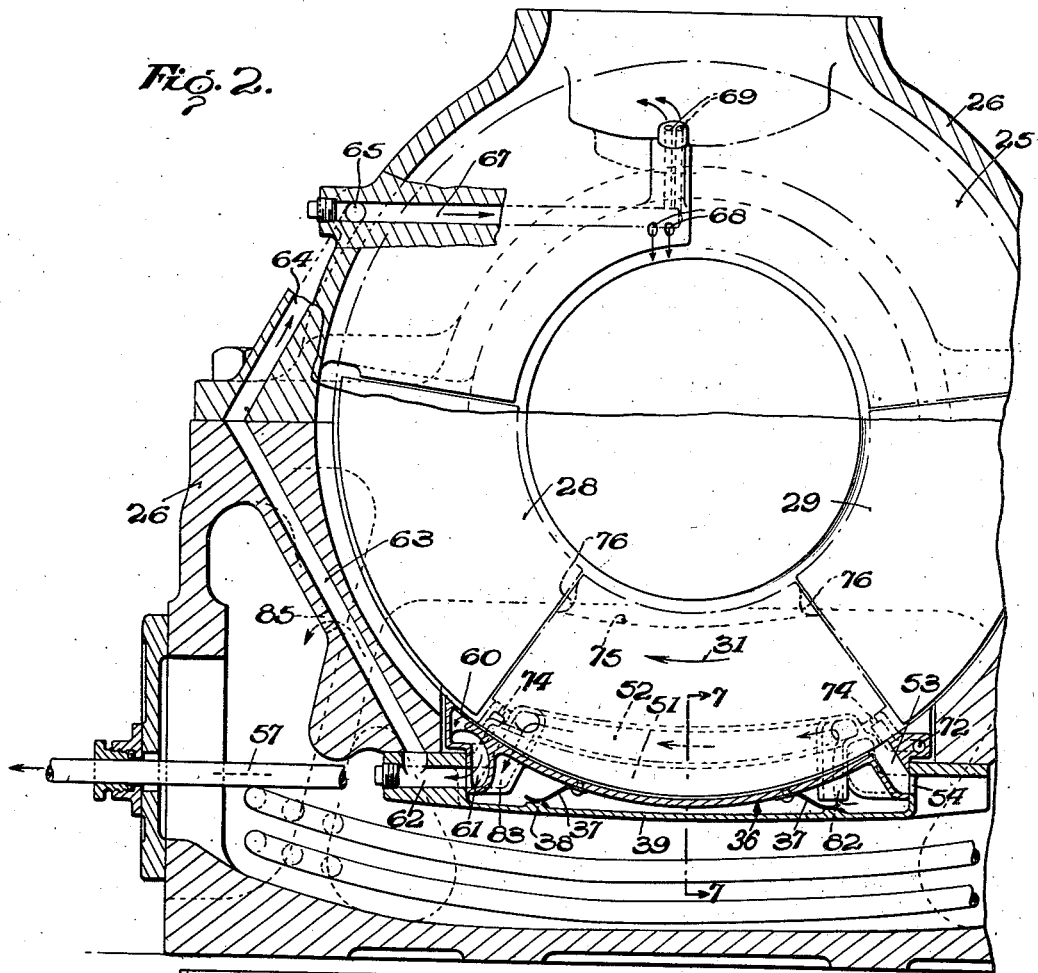
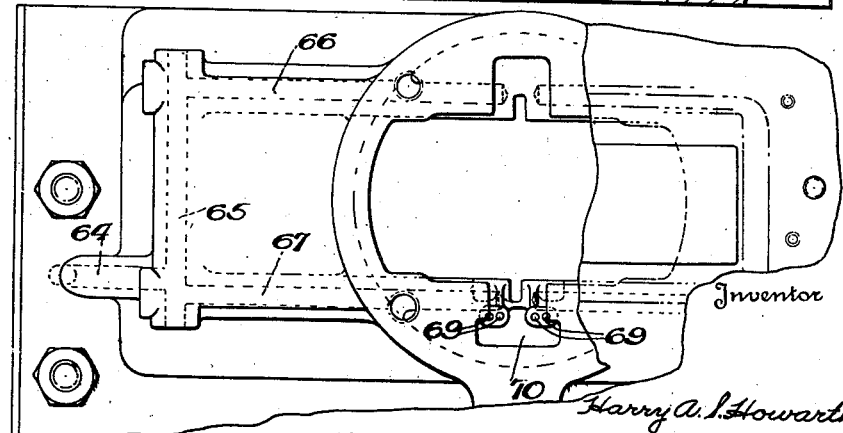

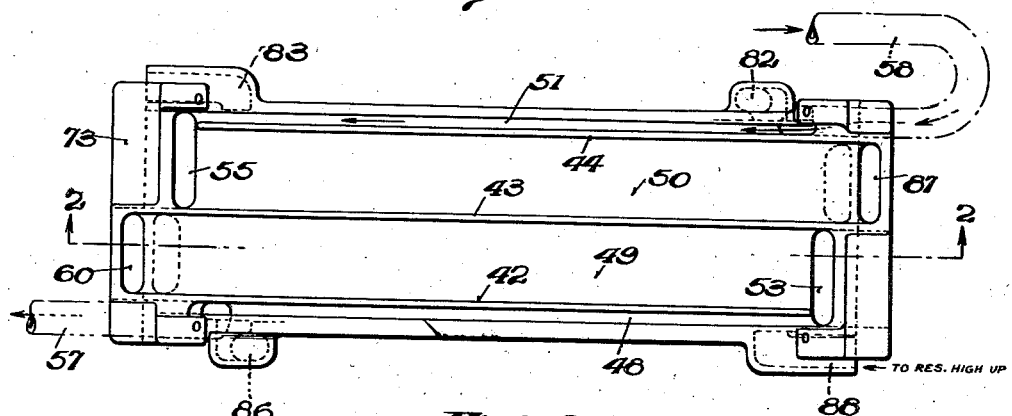
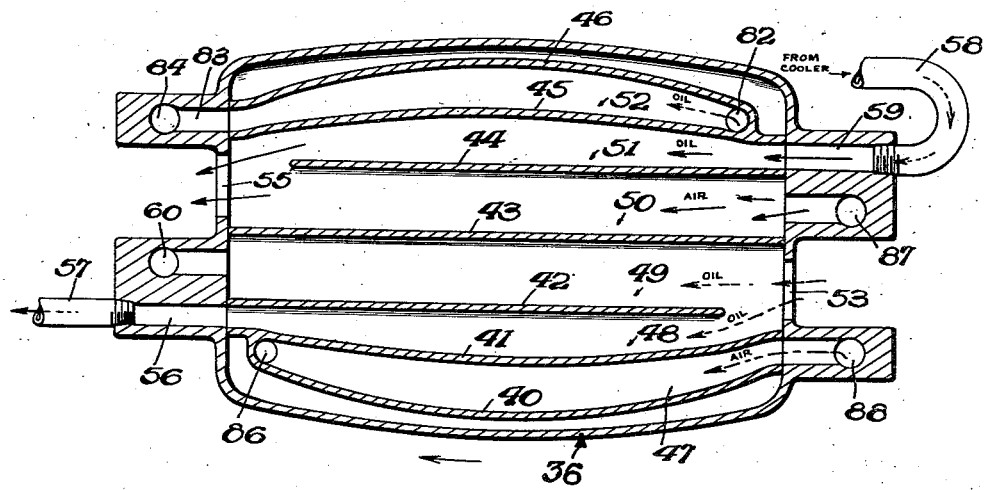
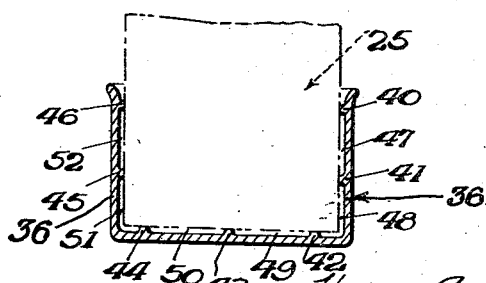

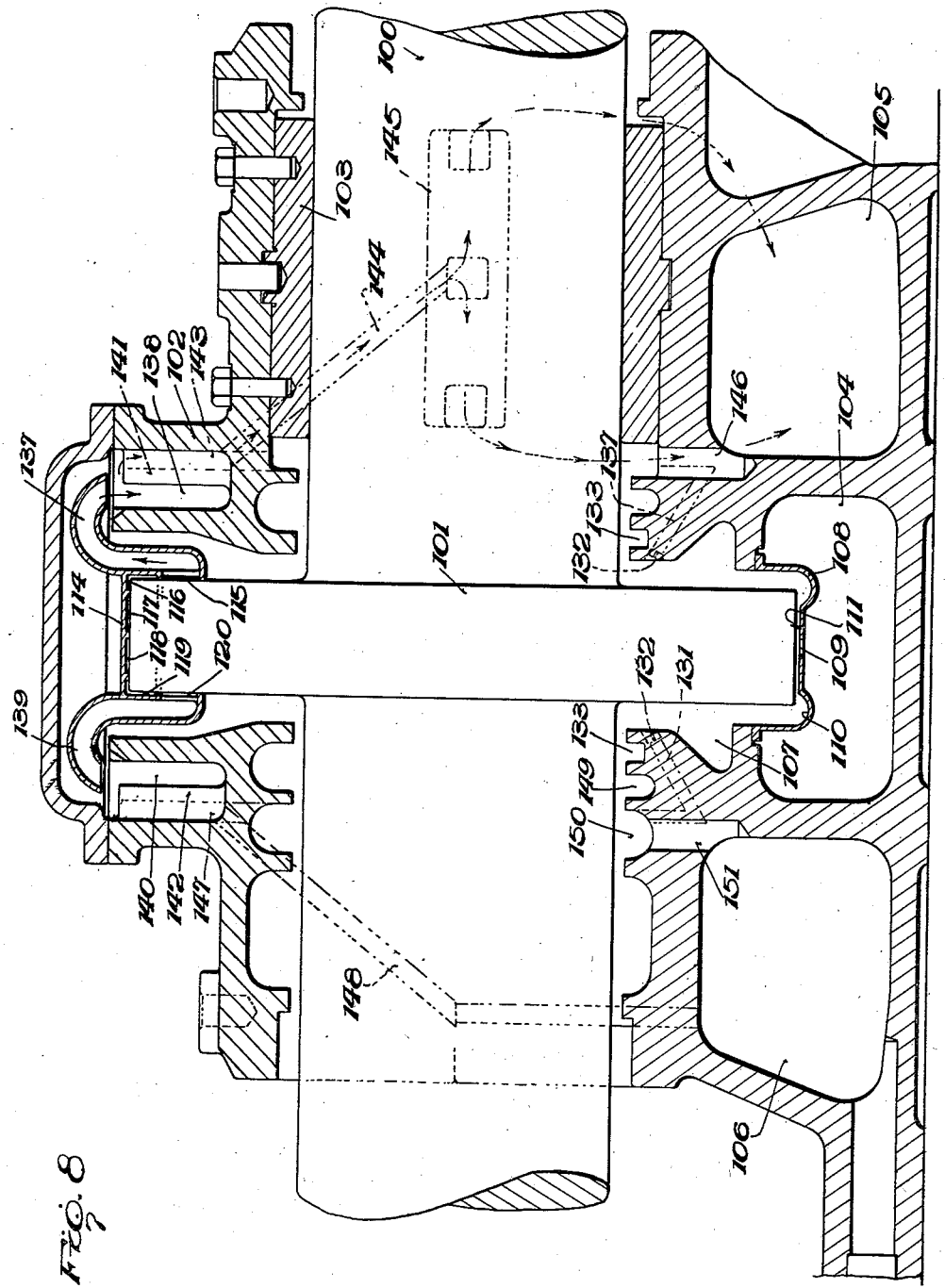

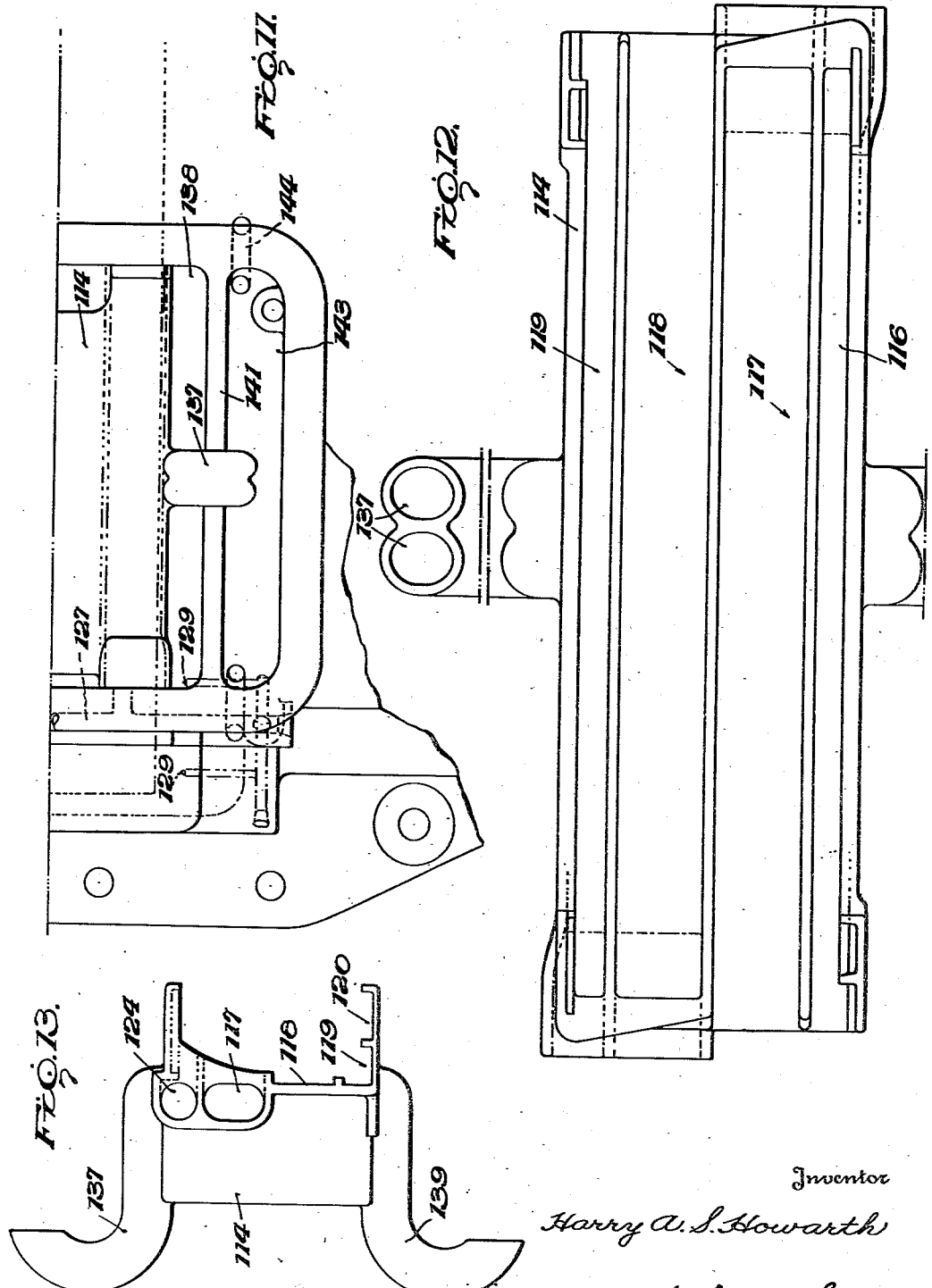

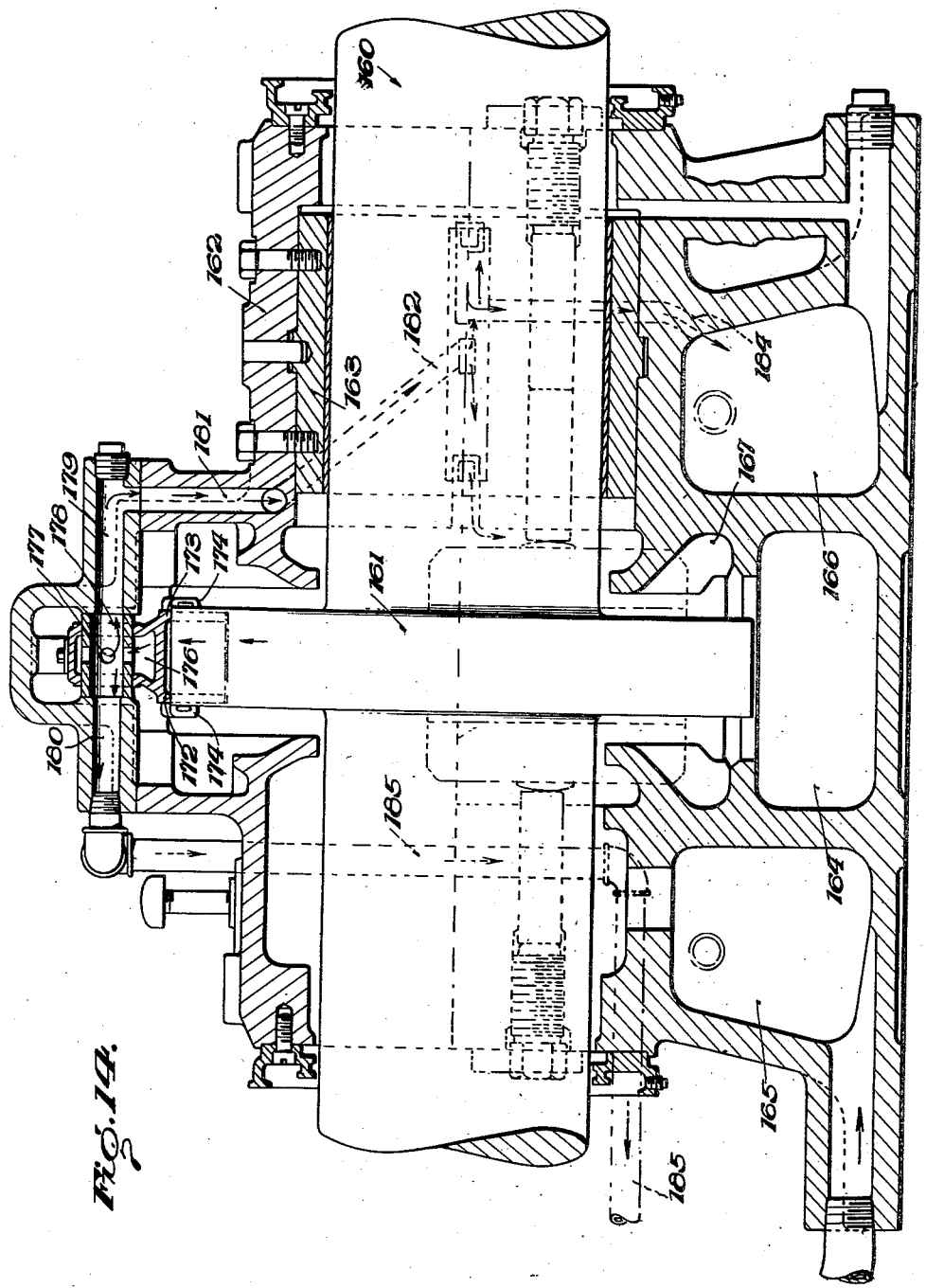

Aug. 8, 1939.  H. A. S. HOWARTH  2,168,343
LUBRICATING MEANS FOR THRUST BEARINGS
Filed Feb. 24, 1937  10 Sheets-Sheet 8

Inventor
Harry A. S. Howarth
By Cameron, Kerkam & Sutton
Attorneys

Aug. 8, 1939.  H. A. S. HOWARTH  2,168,343
LUBRICATING MEANS FOR THRUST BEARINGS
Filed Feb. 24, 1937  10 Sheets-Sheet 9
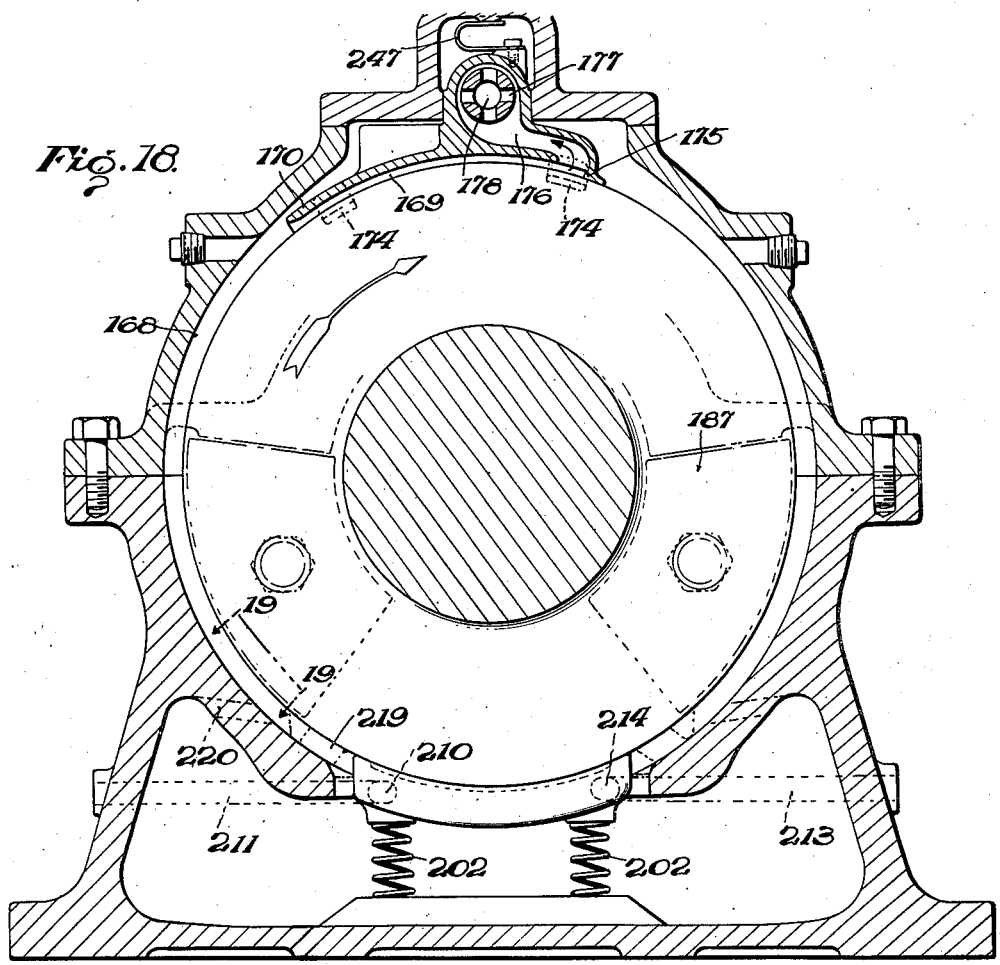
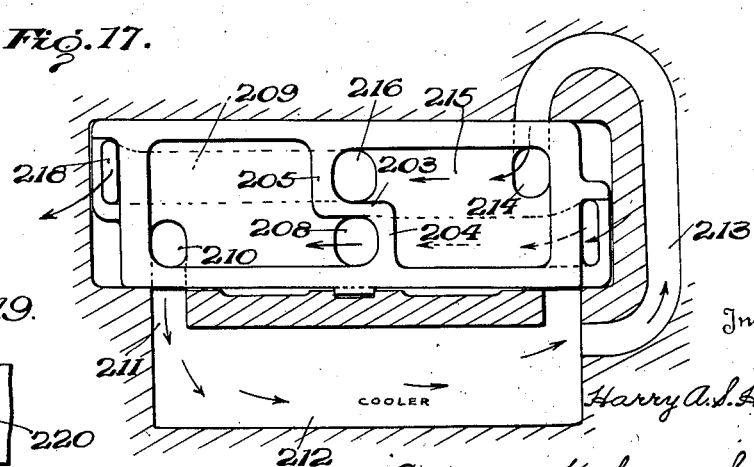
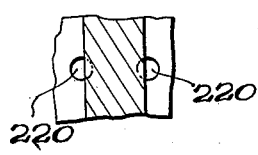
Inventor
Harry A. S. Howarth
By Cameron, Kerkam & Sutton
Attorneys

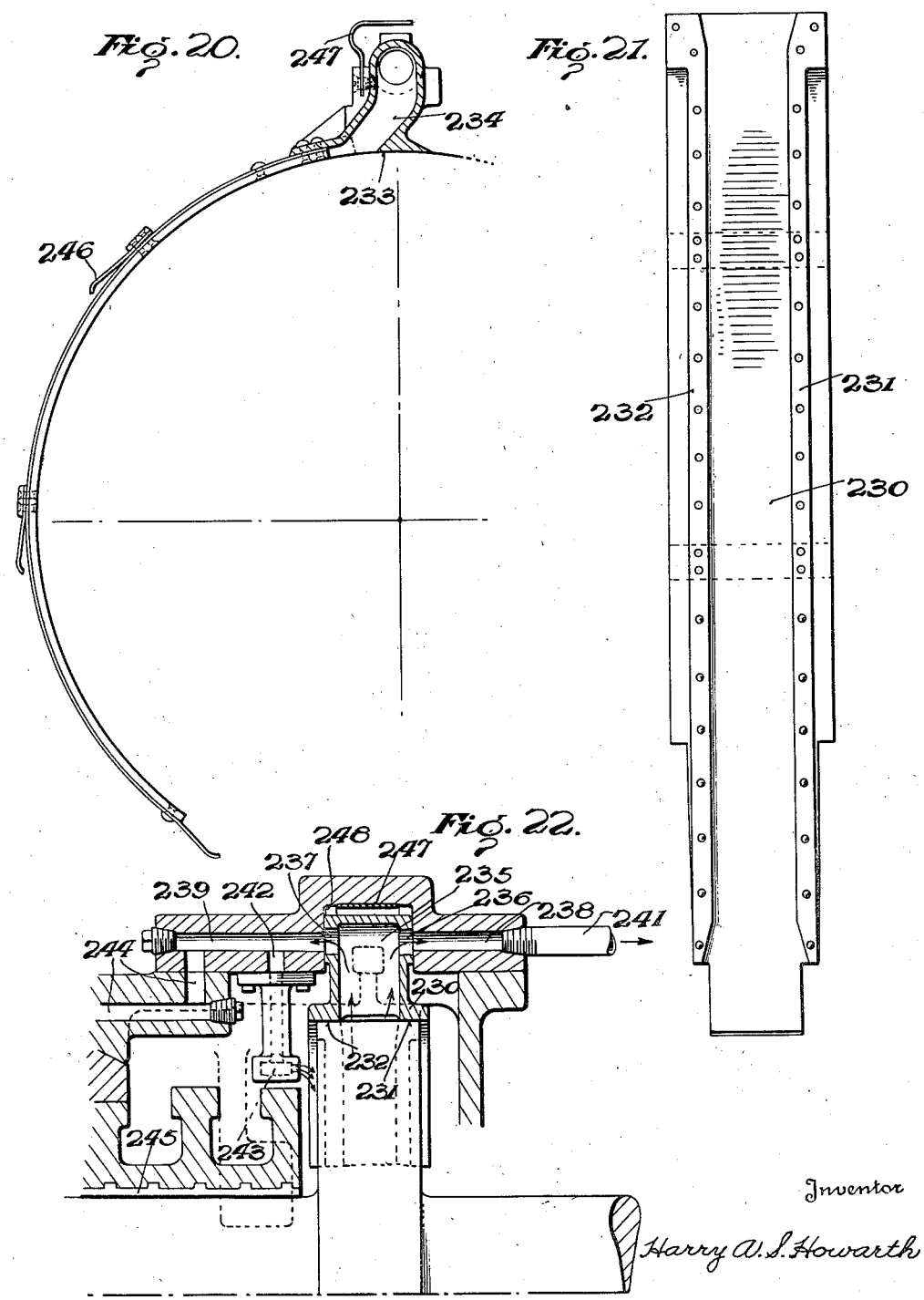

Patented Aug. 8, 1939

2,168,343

UNITED STATES PATENT OFFICE 2,168,343

LUBRICATING MEANS FOR THRUST BEARINGS

Harry A. S. Howarth, Philadelphia, Pa., assignor to Kingsbury Machine Works, Inc., Philadelphia, Pa., a corporation of Delaware Application February 24, 1937, Serial No. 127,551

48 Claims. (Cl. 308—76)

This invention relates to lubricating means for thrust bearings and combined thrust and radial bearings.

It is an object of this invention to provide a thrust bearing or a combined thrust and radial bearing with means for vigorously circulating the lubricating oil to and from oil cooling means while at the same time separately maintaining a copious flow of lubricant to the bearing surfaces.

Another object of this invention is to provide a device of the type characterized which may also have associated therewith means for maintaining the thrust cavity, i. e., the cavity containing the thrust collar and the bearing shoes, relatively free of lubricating oil.

Another object of this invention is to provide a device of the type characterized which, by keeping the thrust cavity relatively free of lubricating oil, minimizes aeration of the oil.

Another object of this invention is to provide a device of the type characterized which is combined with improved means for distributing lubricating oil to the bearing surfaces.

Another object of this invention is to provide a device of the type characterized which may also function as an oil distributor.

Another object of this invention is to provide a device of the type characterized which operates with a minimum of friction and thereby effects its functions with a minimum of resistance and loss of energy.

Another object of this invention is to provide a device of the type characterized which is reversible, i. e., which will function equally well for either direction of rotation of the shaft.

Another object of this invention is to provide a device of the type characterized which will not interfere with axial adjustment of the collar or be rendered less efficient by axial adjustment of the collar.

Another object of this invention is to provide a device of the type characterized which establishes and maintains independent circulations of the lubricating oil to and from the oil cooling means and to and from the oil distributing means.

Another object of this invention is to provide a device of the type characterized which in addition to establishing separate circulations to and from the oil cooling means and to and from the oil distributing means also establishes a third circulation through which oil is withdrawn from the thrust cavity.

Another object of this invention is to provide improved oil distributing means.

Another object of this invention is to provide improved means for assuring that oil collected from a rotating thrust collar is so delivered to the relatively rotating thrust bearing surfaces as to assure a copious and entirely adequate lubrication thereof.

Another object of this invention is to provide a device of the type last characterized with means whereby radial bearing surfaces may also be copiously and adequately lubricated by the oil collected from the rotating thrust collar.

Another object of this invention is to provide a thrust bearing with improved means for maintaining the thrust cavity relatively free of oil.

Another object of this invention is to provide a thrust bearing with improved oil circulating means which maintains a vigorous circulation of oil through oil cooling means.

Another object of this invention is to provide a device of the type last characterized which also includes means for establishing an independent copious flow of lubricant to suitable oil distributing means.

Another object of this invention is to provide a device of the type characterized in combination with improved oil distributing means.

Another object of this invention is to provide a device of the type characterized which incorporates within itself improved oil distributing means.

Another object of this invention is to provide a device of the type characterized with additional means for maintaining the thrust cavity relatively free of lubricating oil.

Another object of this invention is to provide a device of the type characterized which is equally efficient for either direction of shaft rotation.

Another object of this invention is to provide a device of the types heretofore characterized which is relatively simple in construction, easily installed and highly efficient in operation.

Other objects of the invention will appear as the description thereof proceeds.

The invention is capable of receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures:

Fig. 1 is an axial section of an embodiment of the present invention;

Fig. 2 is an end view of the embodiment shown in Fig. 1 with parts broken away to show the construction more clearly;

Fig. 3 is a top plan on a smaller scale view of the embodiment of Fig. 1;

Fig. 4 is a plan view of the oil circulator;

Fig. 5 is an end view thereof;

Fig. 6 is a developed view of the oil circulator to show the disposition of passages therein;

Fig. 7 is a fragmentary cross section through the oil circulator on the line 7—7 of Fig. 2;

Fig. 8 is an axial section of another embodiment of the present invention;

Fig. 9 is a fragmentary view on the line 9—9 of Fig. 10;

Fig. 10 is a somewhat diagrammatic end view of the embodiment of Fig. 8 with parts broken away;

Fig. 11 is a fragmentary top view of the embodiment of Fig. 8;

Fig. 12 is a bottom view of the circulator of Fig. 8;

Fig. 13 is a view taken at right angles to Fig. 12;

Fig. 14 is an axial view of an embodiment of the invention incorporating improved oil distributing means;

Fig. 17 is a somewhat diagrammatic plan view of the embodiment of Fig. 16;

Fig. 18 is an end view of another embodiment of the present invention;

Fig. 19 is a fragmentary view looking from the direction of the line 19—19 of Fig. 18;

Fig. 20 is a side view, partly in section, of an improved oil distributor in conformity with the present invention;

Fig. 21 is a developed plan view of the oil distributor of Fig. 20; and

Fig. 22 is a fragmentary axial section of the oil distributing means of Figs. 20 and 21 in position on the periphery of a thrust collar.

Figure 15:
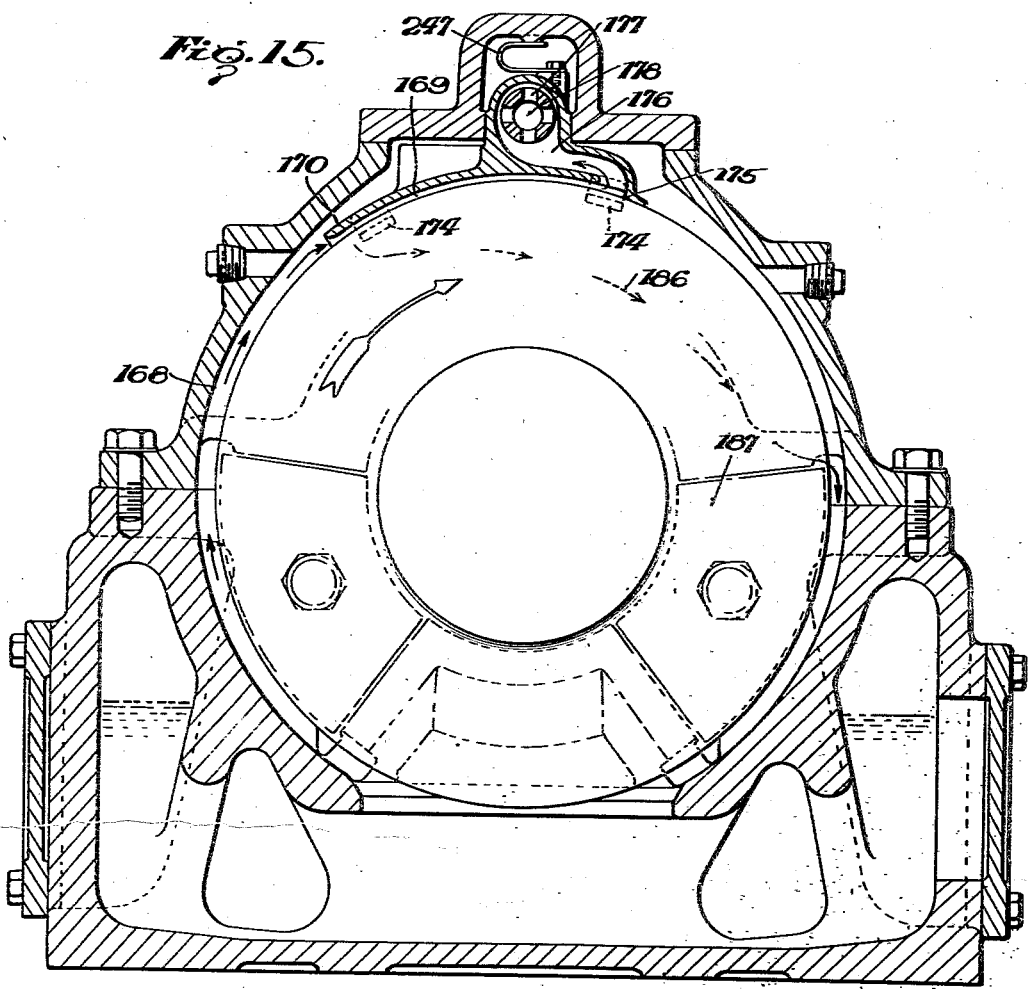
Fig. 15 is an end view of the embodiment of Fig. 14.

For purposes of exemplifying the present invention, the same has been shown as incorporated in a bearing of the two-shoe type, but it is to be expressly understood that the invention is not necessarily restricted thereto, as the same may be embodied in thrust bearings employing a different number of shoes, which may be mounted in any suitable way, provided that the means for leading the lubricating oil to the bearing surfaces is suitably designed to supply adequate quantities of oil to the bearing surfaces, with proper distribution with respect thereto, to assure the establishment and maintenance of the required lubricating films. The invention may also be embodied in either single or double acting thrust bearings, and whether the shaft thereof is to rotate only in one direction or its direction of rotation may be reversed. Furthermore, as the present invention is concerned with the provisions for lubricating the bearing elements, they have only been schematically indicated where desirable for purposes of showing the relative location with respect thereto of the points at which oil is delivered to the bearing surfaces; hence it is to be expressly understood that the bearing elements used with the present invention may be of any suitable construction, they may be mounted in any suitable way, and any suitable provision may be made for effecting an equitable distribution of pressure between the bearing elements, all as will be apparent to one skilled in the art.

Referring first to the embodiments of Figs. 1 to 7 inclusive, shaft 25 is shown as rotatably mounted in any suitable housing 26 and provided intermediate its length with a thrust collar 27 which may be of any suitable construction and formed or secured thereon in any suitable way. As illustrated, both faces of the collar are designed to cooperate with suitable thrust receiving elements suitably mounted in the housing 26, but if preferred the thrust bearing may be of the single acting type, in which event the provisions for effecting lubrication of the bearing surfaces at one face of the collar would be omitted. A pair of thrust receiving elements 28 and 29 are shown in outline in Fig. 2, but otherwise the thrust receiving elements have been omitted from the figures for purposes of clearness.

Suitably mounted in the housing 26 is a radial bearing 30 of any suitable construction. As illustrated a radial bearing is shown at only one side of the thrust collar, but if preferred a radial bearing may also be provided at the opposite side of the thrust collar, in which event the provision for lubricating the radial bearing to be described would be duplicated at the opposite side of the thrust collar. Alternatively, the invention may be incorporated in lubricating means for a thrust bearing per se, in which event the provisions for conveying the lubricating oil to one or more radial bearings would be omitted.

The embodiment of Figs. 1 to 7 includes an oil circulator for maintaining a vigorous circulation of oil through an oil cooler of any suitable design and construction, and which may be mounted exteriorly of the bearing housing or contained within an appropriate part thereof, to the end that larger quantities of heat may be withdrawn from the oil because of the rapid and voluminous circulation obtained through use of the circulator. Thereby the present invention enables the use of higher shaft speeds than would be feasible if the withdrawal of heat depended only on such circulation of the oil as is normally effected by the movement of the oil to and through the cavities containing the bearing elements by reason of the rotation of the thrust collar in the manner heretofore practiced.

The embodiment of Figs. 1 to 7 also includes means whereby the oil is removed from the thrust cavities as rapidly as it flows from the relatively movable bearing surfaces, to the end that said cavities are kept substantially free from oil, except for the oil flowing across the thrust surfaces to maintain the thrust receiving films between the thrust receiving elements, and aeration of the oil by reason of the relative rotation of parts in the thrust cavities is minimized, although as will be apparent from other embodiments of the invention hereinafter described this provision may be omitted if preferred. The embodiment of Figs. 1 to 7 also is designed to function with equal facility for either direction of shaft rotation, although as will be apparent the invention may be embodied in devices designed for only a single direction of rotation, in which event only such passages as are required for that direction of rotation would be supplied. For purposes of the ensuing description it will be assumed that the shaft 25 is rotating in the direction of the arrow 31 in Fig. 2, i. e., clockwise, and it is to be understood that the passages hereinafter described which function for this direction of rotation are duplicated for the reverse direction of rotation, the latter provisions having been in part omitted so as to avoid obscuring the figures.

In the embodiment of Figs. 1 to 7 the oil circulator is associated with the lowermost portion of the thrust collar where, at the beginning of operation, it is normally submerged in oil, the housing including oil containing cavities 32, 33 and 34 which contain sufficient oil so as to tend to maintain an oil level in the housing a suitable distance below the lowermost level of the shaft openings therein. When the shaft is stationary, the oil in these cavities tends to leak into the thrust cavities generally designated 35 in Fig. 1, so that said cavities are also filled with oil up to the normal level of the oil in the housing, and hence the oil circulator, generally designated 36, is submerged therein. Said circulator makes close bearing contact with the periphery of the collar, as is evident from Fig. 7, but the actual areas of contact are relatively small, and as these surfaces are well lubricated the resistance to rotation of the thrust collar by reason of the presence of the circulator, and therefore friction losses due thereto, are relatively small. Said circulator may be mounted in any suitable way, so that it may move axially with the thrust collar upon adjustment thereof. As shown more particularly in Fig. 2, said circulator 36 is mounted upon suitable leaf springs 37 which normally hold the circulator in snug contact with the periphery of the collar, said springs having face engagement with lugs 38 on a cover member 39 secured in any suitable way to close the aperture at the bottom of the thrust cavities. Said springs 37 may slide with respect to the lugs 38, and as the circulator is narrower axially than the surrounding cavity it may move axially with the thrust collar upon axial adjustment of said collar without interference from the surrounding walls.

Referring next to the developed view of Fig. 6, said circulator is provided with circumferentially directed partitions 40, 41, 42, 43, 44, 45 and 46 so as to provide six circumferentially directed channels 47, 48, 49, 50, 51 and 52 which are relatively shallow as appears from Fig. 7. The relationship of said channels to the periphery of the thrust collar will be clear from the fragmentary cross section of Fig. 7. The partiton 42 between channels 48 and 49 does not extend throughout the circumferential length of the circulator, as shown at the right in Fig. 6, but said two channels are there in communication, and the end wall of the circulator opposite these two channels is provided with an opening 53 which communicates with the oil in the reservoir through a suitable passage, as through the opening 54 in the cover 39 (see Fig. 2). Similarly, the partition 44 which separates channels 50 and 51 terminates short of the left-hand end of the circulator as shown in Fig. 6, so that said two channels are in communication, and said two channels communicate through opening 55 with the reservoir, as through an opening comparable to 54 at the opposite side of the cover as viewed in Fig. 2. Partition 43 separates channels 48 and 49 from channels 50 and 51 throughout the circumferential extent of the circulator. Channels 49 and 50 are completely separated by partition 43, and channels 47 and 52 are separated from the remaining channels throughout their circumferential extent as is apparent from Fig. 6.

For rotation of the thrust collar in a clockwise direction as heretofore referred to the action of the lateral and peripheral surfaces of the thrust collar on the oil in the shallow channels heretofore referred to is that of a viscosity pump, and therefore oil is drawn through the inlet opening 53 and forced through the channels 48 and 49. Channel 48 communicates at its opposite end with a passage 56 leading to a pipe 57 (also shown broken away in Fig. 2) which leads to the oil cooler. From the oil cooler oil returns through the pipe 58 to the passage 59 communicating with the channel 51, whence it is forced through the opening 55 back to the reservoir. Hence a copious and vigorous circulation of oil from the reservoir, to and through the cooler and back to the reservoir is maintained at all times that the shaft is rotating, and as this circulation is independent of the circulation to the thrust bearing surfaces, much larger quantities of heat are abstracted from the oil than would be the case if the circulation through the cooler were dependent upon the circulation maintained to the bearing surfaces.

Only a part of the oil that enters through the inlet 53 is forced through the channel 48, the remainder of this oil flowing through the channel 49 which leads to opening 60 (see Figs. 2 and 6) which communicates through passage 61 (see Fig. 2) with a passage 62 formed in the wall of the thrust cavity. From passage 62 the oil is forced upwardly through passage 63 and hence through passage 64 where it divides (see Fig. 3), part flowing through the axially directed passage 65 and inwardly directed passage 66 to the oil delivering jet or jets at one side of the thrust collar, and the remainder flowing through inwardly directed passage 67 to the oil jet or jets at the opposite face of the thrust collar. Oil flowing through passages 66 and 67 is delivered through one or more nozzles 68 at each side of the thrust collar (see Figs. 1 and 2) adjacent the fillet between the face of the thrust collar and the circumferential surface of the shaft. Where, as here, the oil is also to be delivered to one or more radial bearings, one or more additional passages 69 lead from the passage 67 and delivers oil into a small well 70 from which the oil is conveyed to the radial bearing as hereinafter described. It will be noted from Fig. 3 that this provision for delivering oil to the well 70 is duplicated at opposite sides of the vertical axial plane of the bearing, so that oil will be delivered to said well for either direction of shaft rotation. Also leading from passage 62 at both sides of the circulator are passages 72 within the end wall of the circulator leading to jets or nozzles 74 adjacent the outer lower corners of the shoes, one at each face of the thrust collar (these passages 72 leading to nozzles 74 for the opposite direction of rotation being also clearly shown at the right-hand end of the circulator in Fig. 2).

Thus oil is delivered to the lower outer corners of the shoe with respect to which the thrust collar is rotating upwardly, and also adjacent the inner periphery of the thrust bearing surfaces in the uppermost portion of the bearing, so that the bearing surfaces are copiously lubricated thereby. The oil delivered at the uppermost part of the bearing flows partly across the bearing faces of the thrust collar and some of it along the circumferential surface of the shaft, as indicated by arrows in Fig. 1. Some of the latter drops from the shaft into circumferential channels 75 formed in the peripheral walls of the shaft openings at the lateral extremities of the thrust cavities. As shown in Fig. 2 said channels 75 extend the full circumferential length of the spacers between the shoes 28 and 29, and at the opposite extremities of said channels lateral openings 76 are provided, as shown in Fig. 2, so that the oil collecting in said channels 75 and backed up by the edges of the shoes in the direction of rotation will flow therethrough to the adjacent thrust surfaces of the collar, this latter oil being delivered adjacent the inner periphery of said thrust surface at the leading-in edges of the shoes with respect to which the shaft is rotating upwardly. This latter oil supplements the oil delivered by the nozzles 74 so that oil is supplied to the thrust surfaces at the leading-in edges of the shoes with respect to which the collar is rotating upwardly and adjacent both outer and inner corners thereof. If desired each shoe may have a groove or passage in alignment with the corresponding channel 75 so that oil may flow through the groove in the shoe with respect to which the collar is rotating downwardly in order to facilitate filling said channel 75. In this event each groove should be axially wider than the channel 75 so as not to get out of alignment therewith on adjustment of the collar. The oil which collects in the channels 75 is also useful in supplying oil to the inner peripheries of the bearing surfaces when the bearing is started in operation.

Therefore, the oil delivered by the circulator through channel 49 provides for the copious lubrication of the thrust receiving surfaces, said oil being delivered to said surfaces under the pressure generated in said channel 49 and passages leading therefrom and flowing across said surfaces as the collar rotates so that said surfaces are wetted throughout their radial width and the desired oil films established and maintained.

For removing oil from the periphery of the thrust collar and supplying it to the thrust surfaces during the initial period of starting the shaft, before the circulator has had an opportunity to supply oil under pressure to the jets or nozzles 68 and 74, and also to supplement the latter by deflecting oil onto and across the bearing surfaces of the collar, during normal operation of the bearing, an oil scraper or distributor, generally indicated at 77 in Fig. 1, may be disposed adjacent the uppermost portion of the thrust collar, for cooperation with the periphery thereof, said scraper or distributor removing oil that is carried up by said periphery and deflecting the same laterally onto the thrust surfaces of the collar. While any suitable oil distributor may be used for this purpose, preferred forms of oil distributors for use in conjunction with the oil circulator are illustrated in some of the figures, and hereafter described in detail, in conjunction with other embodiments of the invention.

The oil delivered to the well 70 may flow through any suitable passages 78 to oil distributing grooves or recesses diagrammatically indicated at 79 in Fig. 1 from which the radial bearing surfaces are properly lubricated. The oil flowing from the radial bearing surfaces is collected adjacent the opposite extremities thereof, as in grooves 80, and conducted through passages 81 back to the oil containing chambers which constitute the oil reservoir.

It is sometimes preferred to prevent the accumulation of oil in the thrust cavities to reduce friction losses and aeration of oil therein, and to this end the circulator of the embodiment of Figs. 1 to 7 is provided with means for removing oil from the thrust cavities as rapidly as it flows across the bearing surfaces—and returning it to the reservoir. As shown in Figs. 2 and 4 channel 52 communicates through a downwardly extending passage 82 with the bottommost portion of the thrust cavity, the cover 39 here being shown as constituting a sump into which the oil will drain and into contiguity with the bottom of which the passage 82 extends. Oil drawn into the channel 52 through passage 82 is forced outwardly through passage 83 to an opening 84 which communicates with a pasasge formed in the wall of the thrust cavity (and which lies back of the passage 63 in Fig. 2). Said last named passage leads to an opening 85 as shown in dotted lines in Fig. 2 and which is disposed above the level of the oil in the reservoir. Hence oil is drawn from the sump and returned to the reservoir above the level of the oil therein.

Thus, to summarize, when the shaft is rotating in a clockwise direction, or from right to left as viewed in Fig. 6, oil is drawn from the reservoir through openings 54 and 53. Part of it is forced through channel 48, pipe 57 and the oil cooler, whence it returns through pipe 58 and passage 59 and is forced through channel 51 for delivery through opening 55 to the reservoir. The remainder of the oil entering through opening 53 is forced through channel 49 to the passages leading to the jets or nozzles 68 and 74 whereby the bearing surfaces are lubricated. Some of the oil returning is caught in channel 75 and delivered to the leading-in edge of the shoe with respect to which the collar is rotating upwardly, but the larger proportion of the oil falls into the sump where it is withdrawn through passage 82 and forced through channel 52, passages 83 and 84 and thence through the opening 85 above the level of the oil in the reservoir. During this operation channel 47 tends merely to draw in air through passage 88 which leads from the opening corresponding to opening 85 and delivers it through the downwardly extending passage 86 (corresponding to 82) to the sump, but little air is so moved because of the low head thereon. Channel 50 is performing no function as it tends merely to draw air through the pasages 87 which lead to the nozzles for the opposite direction of shaft rotation, but here again little air is actually moved.

On reversal of the direction of shaft rotation oil is drawn in through opening 55, forced to the cooler through channel 51 and pipe 58, whence it returns through pipe 57 to channel 48 and is forced into the reservoir through openings 53 and 54. The remainder of the oil drawn through opening 55 is forced through channel 50 and passages 87 precisely like those communicating with passage 60 at the opposite side of the center line of the bearing, whereby the nozzles for the reverse direction of rotation are similarly supplied with oil through said passages 87. Oil returning to the sump is drawn into channel 47 through passage 86 and forced through passage 88 to an elevated opening above the level of the oil in the reservoir, corresponding to opening 85 but at the opposite side of the bearing. During this direction of rotation channels 52 and 49 tend merely to draw air.

As shown, the well 70 at the left of the collar in Fig. 1 tends to fill and overflow (if not used for lubricating a radial bearing) to assist in wetting the adjacent face of the thrust collar, and any overflow from the well 70 at the right of the collar in Fig. 1 serves a like function.

It will therefore be perceived that the circulator of the present invention assures a vigorous and copious circulation of the oil from the reservoir to and from the cooler independently of the oil delivered to the bearing surfaces. At the same time copious quantities of oil are forced under pressure to the thrust bearing surfaces, and also to one or more radial bearings if desired, and in the embodiment of Figs. 1 to 7 the oil returning to the sump provided at the bottom of the thrust cavities is promptly withdrawn and returned to the reservoir above the level of the oil therein so that said thrust cavities are maintained substantially free of oil.

In the embodiment so far described the distribution of the oil adhering to the periphery of the thrust collar is effected by use of a scraper or distributor associated with the uppermost part of the thrust collar, said scraper being of any suitable construction and operating in the usual way to remove oil from the peripheral surface of the thrust collar and deflect it radially inwardly over the lateral bearing faces thereof. The function of the distributor, however, may be combined with the circulator, and a single structure applied to the periphery of the thrust collar to perform the distributing function as well as the functions heretofore described for the circulator of Figs. 1 to 7. This is illustrated in the embodiment of Figs. 8 to 13 inclusive.

As here shown, shaft 100 is provided with any suitable thrust collar 101 and is mounted in any suitable housing 102. A radial bearing 103 of any suitable character is associated with said shaft at one side of said thrust collar and, if desired, a radial bearing may also be associated with the shaft at the opposite side of said thrust collar. As in the embodiment of Figs. 1 to 7 the housing has suitable chambers 104, 105, 106 which constitute the reservoir for the lubricating oil. In this embodiment the thrust cavities 107 are closed at their bottom by a cover 108 provided with an inlet opening 109, said cover and the radially circum-adjacent wall of the thrust cavities being disposed closely adjacent the periphery of the thrust collar, as shown in Figs. 8 and 9, so that said thrust collar cooperates with said circum-adjacent wall to function as a viscosity pump. Thereby oil flows through the inlet opening 109 and is raised by the peripheral surface of the thrust collar by reason of its cooperation with said circum-adjacent wall.

As shown in Figs. 8 and 9 the cover 108 and the circum-adjacent wall around the periphery of the thrust collar may be provided with grooves 110 and 112 opposite the lateral edges of the periphery of the thrust collar so as to predetermine the width of the lands 111 and 113 which constitutes the circum-adjacent surface cooperating with the periphery of the thrust collar. The lands of fixed width assure a constantly equal quantity of oil raised by the thrust collar notwithstanding axial adjustment of the collar as long as these lands are in radial alignment with the periphery of the thrust collar. By varying the width of the lands 111, 113 the quantity of oil raised by the thrust collar can be controlled and predetermined with respect to the optimum requirements of the particular bearing. These grooves also function to return excess oil to the oil reservoir.

In this embodiment the circulator, generally designated 114 in Fig. 8, is associated with the upper peripheral portion of the thrust collar so that it may also function as a distributor. As in the embodiment of Figs. 1 to 7 said circulator closely embraces the periphery of the thrust collar and is provided with a plurality of internal circumferential partitions which cooperate with the surface of the thrust collar to subdivide the interior of the circulator into a plurality of shallow channels 115, 116, 117, 118, 119 and 120 which correspond in function with the corresponding channels 47, 48, 49, 50, 51 and 52 of the embodiments of Figs. 1 to 7. In this embodiment, as indicated in Fig. 10, the thrust collar is assumed to be rotating in the direction of the arrow 121, i. e., counterclockwise.

Oil carried upwardly by the peripheral portions of the thrust collar enter the channels 118, 119 for the aforesaid direction of rotation. The oil which comes through the channel 119 is delivered to pipe 122 whence it flows to any suitable oil cooler, disposed either internally or externally of the bearing housing, and thence returns from the oil cooler through pipe 123 to channel 116, where it is delivered to the thrust cavity at that portion thereof where the thrust collar is rotating downwardly. Oil pumped through the channel 118 is delivered to passage 124, and the oil so delivered to passage 124 flows through an axially extending passage 125 where it is divided, and then caused to flow through downwardly directed passages 126 to inwardly and outwardly directed passages 127 from which passages 128 lead to the jets 129. Passages 126, 127 and 128 as well as the jets 129 are duplicated at opposite faces of the thrust collar, and therefore it will be sufficient to describe one set thereof. The jets 129 are disposed adjacent the leading-in edge of the shoe 130, one of said jets being adjacent the outer corner thereof and the other of said jets being disposed inwardly of the circumferential medial line of the shoe. Also communicating with the passage 127 is a passage 131 which extends diagonally downwardly and then upward to a jet 132 adjacent the inner periphery of the surface of the thrust collar.

Oil is also delivered to grooves 133 in the spacer members disposed between the two bearing shoes, and as in the embodiment of Figs. 1 to 7, oil in the grooves 133 is backed up by the leading-in edge 134 of the shoes with respect to which the collar is rotating upwardly and can escape laterally through openings 135 to provide the desired lubrication as explained in connection with Figs. 1 to 7. Oil carried upwardly by the lateral faces of the thrust collar at either side of the passages 116, 117, 118 and 119 enters the channels 115 and 120. In order that these channels may function for either direction of rotation they are provided, approximately in the vertical medial plane of the bearing, with transverse partitions 136 which have rubbing engagement with the lateral faces of the thrust collar and therefore operate as scrapers to deflect the oil in channel 115, for example, upwardly through passages 137 to a well 138 and the oil in channel 120 through passage 139 to a well 140. Passages 137 and 139 are duplicated at each face of the thrust collar, as shown in Fig. 10, and hence upon reversal of the direction of rotation, oil entering said channels 115, 120 in the opposite direction is deflected through the second set of said passages into said wells 138 and 140.

Each of said wells 138 and 140 is provided with a transverse partition 141 and 142, providing a dam therein and whose top is somewhat below the level of the top of the well. From chamber 143 passages 144 lead to the grooving 145 of the radial bearing 103, and the oil returns therefrom to the reservoir through passages 146. At the opposite face of the thrust collar oil flowing over the dam into chamber 147 is returned to the reservoir through passages 148, but if a radial bearing were provided at this face of the thrust collar the construction at the opposite side of the thrust collar would be duplicated.

It is to be understood that the provisions for effecting lubrication at the left of the center line in Fig. 10 are duplicated at the right thereof, these parts having been omitted for the sake of clearness, and hence if the direction of the rotation is reversed the oil will be collected from the periphery of the thrust collar and circulated through the oil cooler in the opposite direction from that above indicated, while oil will also be collected from the periphery of the thrust collar and forced through the jets oppositely disposed from those above described. If the wells 138 and 140 overflow, the oil is conveyed down the inner faces of the thrust cavity and distributed to the lateral faces of the thrust collar as well as to the peripheral surfaces of the shaft as heretofore described in conjunction with the embodiments of Figs. 1 to 7. Some of the oil on the periphery of the shaft will fall into the grooves 133 while the rest of the oil will be collected in grooves 149 and 150 whence it may be returned to the reservoir through suitable passages, as for example those illustrated at 146 and 151.

It will therefore be perceived that in this embodiment of the invention the oil circulator functions also as a distributor, removing oil from the surfaces of the thrust collar and distributing the same to the bearing surfaces. The thrust cavities are kept substantially free from oil because it is pumped upwardly by the peripheral surface of the collar, and removed as fast as it covers the land 111 at the bottom of the cover. At the same time the oil circulator maintains a vigorous and copious circulation of oil through the oil cooler, which circulation is independent of that maintained to the bearing surfaces, and additionally, oil collected from the periphery of the thrust collar is forced under pressure to suitably distributed jets to assure a copious lubrication of the bearing surfaces. If desired an additional oil scraper may be associated with the circulator of Figs. 8 to 13 or the end portions of said circulator may be so formed as to remove and deflect oil onto the inner peripheral portions of the thrust surfaces of the collar or onto the shaft surfaces.

In the embodiment of Figs. 14 and 15 an improved distributor is illustrated for cooperation with the periphery of the thrust collar, the distributor here illustrated being available for use with such an oil circulator as illustrated, for example, in the embodiments of Figs. 1 to 7, or it may be used without an oil circulator. As here shown, the shaft 160 has any suitable thrust collar 161 and is mounted in a suitable housing 162. A radial bearing is illustrated at 163 at one side of the thrust collar, and at the other side a radial bearing may also be provided if desired. Said housing 162 is shown as provided with internal chambers 164, 165 and 166 which constitute the oil reservoir. In this embodiment the lower face of the thrust cavity 167 is not closed, and the periphery of the thrust collar is at all times immersed, at the lower portion thereof, in the oil in said reservoir. Oil carried upwardly by the pumping action of the periphery of the thrust collar through the narrow radial space between the same and the circum-adjacent wall 168 of the thrust cavity (see Fig. 15) enters the circumferentially directed and radially restricted channel 169 formed between the periphery of said thrust collar and the circumferentially directed wall 170 of the distributor. Said channel 169 is defined at its lateral extremities by circumferentially directed ribs 172 and 173 which bear on the peripheral surface of the thrust collar. To properly locate the distributor with respect to the periphery of the collar said distributor is shown as provided with two pairs of inwardly directed lugs 174 which bear on the lateral faces of the thrust collar and retain the distributor against displacement therefrom. If desired the channel 169 may be made of radially decreasing dimension in the direction of its length so as to increase the pressure on the oil pumped therethrough.

In any event, channel 169 is closed at its end by an oil scraping edge 175 whereby the oil flowing through the channel 169 is removed from the periphery of the thrust collar and deflected through passage 176 whence it enters through apertures 177 into an open ended axially directed passage 178 communicating at its opposite ends with passages 179 and 180. The oil flowing into passage 179 passes downwardly through passage 181 whence it is led through passage 182 to the grooving of the radial bearing 163, thereafter returning to the reservoir through passage 184. If the opposite end of the bearing housing is provided with a second radial bearing, the oil flowing through passage 180 may be led thereto by duplicating the passages heretofore described in conjunction with the radial bearing 163. Alternatively, the oil flowing through passage 180 may be led through suitable piping 185 to an oil cooler, disposed externally or internally with respect to the bearing housing and thence returned to said housing, or such a conduit leading oil to the cooler may be provided even though two radial bearings are employed. Passage 185 may also lead to a more remote radial bearing. Thus the oil collected from the periphery of the thrust collar may be vigorously circulated through the oil cooler independently of the circulation maintained to the bearing surfaces by the action of the distributor as a scraper and deflector of the oil not entering passage 169, and hence the distributor of this embodiment may also function as a circulator, as will be apparent from the foregoing description.

Not all of the oil carried upwardly by the periphery of the thrust collar enters the channel 169, as heretofore noted, but the restricted entrance thereto causes a substantial portion of the oil to be deflected laterally as shown by the dotted lines 186 in Fig. 15 so that a copious flow of oil to the leading-in edges of bearing shoes 187 is maintained. The construction as illustrated is not designed to function as described upon reversal of the shaft, but as will be apparent from the foregoing description the distributor of Figs. 14 and 15 may be provided with a duplicated passage, or made symmetrical with respect to a vertical medial plane, so that it will function as described upon reversal in the direction of shaft rotation.

Figure 16:
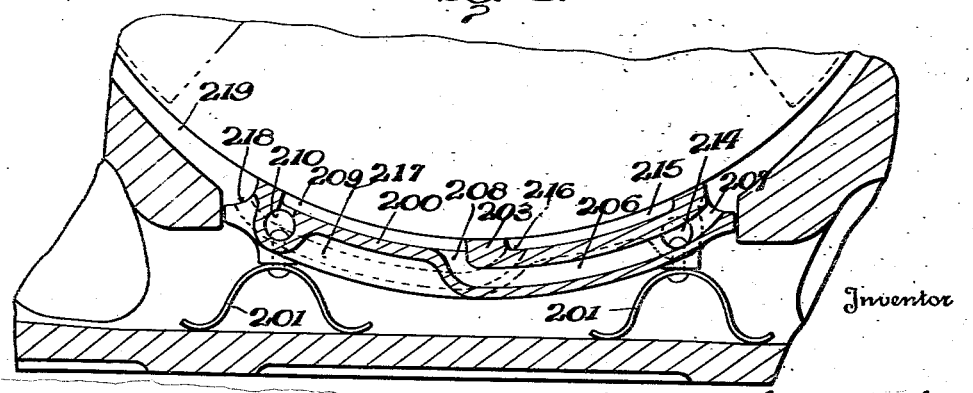
Fig. 16 is a fragmentary sectional view of another embodiment.

The embodiments of Figs. 16 to 19, inclusive, employ a distributor of the construction described in conjunction with Figs. 14 and 15 in combination with a separate circulator (Fig. 18), or the circulator of Figs. 16 and 17 may obviously be used with any other suitable distributor or oil scraper, such for example as illustrated in Figs. 1 to 7. In so far as the distributor of Fig. 18 is concerned, the construction is the same as in Fig. 15, and corresponding reference characters indicate like parts.

The circulator of Figs. 16 and 17 is shown as an arcuate member 200 suitably held in peripheral contact with the thrust collar, as by leaf springs 201 (Fig. 16) or coil springs 202 (Fig. 18), and as shown in Fig. 16 it may substantially fill the opening from the oil reservoir to the thrust cavity. Said circulator is provided with a transverse partition 203 having a circumferentially directed central portion and axially directed end portions 204 and 205 which cooperate with the periphery of the thrust collar to function as an oil scraper for opposite directions of rotation. Interiorly, said circulator is provided with a passage 206 leading from an opening 207 to an opening 208 on the opposite side of the portion 204 of transverse partition 203 which opening communicates with chamber 209. Chamber 209 has an outlet opening 210 leading through any suitable passage 211 to an oil cooler diagrammatically indicated at 212 and which may be disposed either interiorly or exteriorly of the bearing housing. Passage 213 leads from the oil cooler through opening 214 to the chamber 215 on the opposite side of said transverse partition 203 from opening 208, and said chamber 215 communicates through opening 216 with passage 217 leading to opening 218. Assuming a clockwise direction of rotation, oil enters the opening 207, flows through passage 206 and is forced from chamber 209, to and through the oil cooler 212, whence it returns through passage 213 to chamber 215, and thence is delivered through passage 216 to outlet opening 218. Thereby a vigorous and copious circulation of oil is maintained through the oil cooler. If the direction of shaft rotation is reversed, the oil enters through opening 218, is pumped through chamber 215 to passage 213, whence it flows through the oil cooler and, returning to chamber 209, flows through passage 206 to opening 207.

For either direction of rotation the oil delivered from the circulator flows into the confined annular space 219 between the periphery of the thrust collar and the circum-adjacent wall of the housing, so that oil is then pumped by the thrust collar, cooperating with said circum-adjacent wall to constitute a viscosity pump, upwardly to the distributor illustrated. In order that a part of the circulation shall be entirely independent of the flow of oil to the distributor, and also to control the quantity of oil moved upwardly by the periphery of the thrust collar, the circum-adjacent wall of the thrust cavity may be provided opposite the edges of the thrust collar with a pair of openings 220 as shown in Figs. 18 and 19. Hence some of the oil flowing from the circulator is forced to flow through the passages 220 and is returned to the reservoir without being elevated to the distributor. By suitably sizing and spacing the openings 220 the quantity of oil moved upwardly to the distributor can be closely predetermined, and thereby a function subserved analogous to that of the lands in the embodiment of Figs. 8 to 13. By making the openings 220 of a size substantially equal to the size of the clearance around the circulator, the thrust cavity can be kept substantially free of oil except for that flowing across the bearing surfaces.

Figs. 20 to 22 inclusive show another embodiment of distributor which may be used with any of the circulators heretofore described, and which may also function as a circulator as in the embodiment of Figs. 14 and 15. In this embodiment the distributor takes the form of an arcuate member 230 having at the lateral extremities thereof inwardly directed ribs 231 and 232 designed to have bearing engagement with the periphery of the thrust collar, said ribs 231 and 232, together with member 230 constituting a radially narrow channel which cooperates with the periphery of the thrust collar to provide a viscosity pump. As shown in Fig. 21, the ribs 231 and 232 may be inclined slightly toward each other so that the transverse dimension of the channel is progressively decreased in order to progressively increase the pressure of the oil passing therethrough. As will be apparent, the same effect could be obtained by progressively decreasing the radial dimension of said passage. Oil flowing through the channel just described is removed from the periphery of the thrust collar by the edge 233 and deflected upwardly through passage 234, whence it is delivered to chamber 235 (Fig. 22) having openings 236 and 237 communicating with passages 238 and 239. The oil flowing through the latter passages may be led to one or more radial bearings or to jets for lubricating thrust bearing surfaces or to obtain a vigorous circulation through an oil cooler. Thus in Fig. 22, passage 238 is shown as communicating with pipe 241 which may lead to an oil cooler, while passage 239 communicates through passage 242 with a jet 243 and also with a second passage 244 which may supply oil to the radial bearing 245.

The distributor of this embodiment may be held in position in any suitable way. As shown the member 230 carries a plurality of leaf springs 246 which engage the circum-adjacent wall of the thrust cavity and hold the distributor against the thrust collar with suitable tension. The oil circulating portion of the distributor may also be urged against the thrust collar by leaf spring 247. Circumferential displacement of the distributor is prevented by said distributor closely engaging the walls of the cavity 248. While this distributor as shown is suitable only for one direction of shaft rotation, it is apparent that the construction could be duplicated at the right of the center line of Fig. 20 so as to be symmetrical with respect to a vertical medial plane and thereby function equally well for either direction of shaft rotation. It is to be understood that the embodiment of Figs. 20 to 22 may be used in place of the distributor shown in Figs. 14 to 19 or in place of the oil scraper in Figs. 1 to 7, or with any other suitable embodiment of the oil circulator, or it may be used without an oil circulator, but as heretofore pointed out, said distributor may also function itself as an oil circulator.

It will therefore be perceived that by the present invention provision has been made whereby the oil is caused to circulate vigorously through an oil cooler by reason of the pumping action of the thrust collar on the oil, and that this circulation is maintained independently of the circulation of oil to the bearing surfaces. Therefore, a more copious and vigorous circulation of oil through the oil cooler may be maintained, to abstract large quantities of heat, than if the circulation through the oil cooler were an incident of or dependent upon circulation to the bearing surfaces. Therefore, higher speeds of rotation may be used with assurance that the quantities of heat generated in the bearing as an incident thereto will be properly removed from the oil. Furthermore, this circulation is maintained without materially increasing the friction losses within the bearing because of the manner of cooperation of the circulator with the rotating parts of the bearing.

Additionally, the circulator may also function as a distributor, or it may function in combination with separate distributing means, and in either event copious lubrication of the bearing surfaces is assured. Moreover, improved distributing means have been provided so that adequate quantities of lubricant are supplied to the bearing surfaces, and the lubricant collected by the distributor may also be used to afford copious lubrication of one or more radial bearings—and also to insure forced flow of oil under pressure to jets or other lubricating devices to obtain the desired distribution and quantity of lubricant at the bearing surfaces.

Furthermore, the present invention provides means whereby the oil may be removed from the thrust cavity as rapidly as it traverses the thrust surfaces, and thereby said cavity may be maintained substantially free of oil except for that which is wetting the bearing surfaces. This provision for withdrawing oil from the bearing cavity may be combined with the oil circulator and provision for forcing oil under pressure to lubricating jets, so that all of these functions may be efficiently performed by a relatively simple and compact device which can be readily asembled with a thrust bearing as installed.

An improved oil distributing means which may be used independently of oil circulating means has also been provided. Thus the present invention assures in a simple and efficient manner a controlled circulation to and from oil cooling means, a controlled circulation to desired forms and distribution of lubricating means for either or both thrust and radial bearings, and also if desired means for withdrawing the oil from the bearing cavities and returning the same to the reservoir as rapidly as the oil traverses the bearing surfaces.

While the embodiments of the invention illustrated on the drawings have been described with considerable particularity, it is to be expressly understood that the invention is not restricted thereto, as these embodiments have been selected for the purpose of exemplifying the invention and, as will now be apparent to those skilled in the art, the invention may take a variety of embodiments, various combinations of the features disclosed may be used without the use of other features, various features may be used independently of other features, and changes may be made in the details of construction, arrangement and proportion of parts without departing from the spirit of this invention. It is also to be understood that if the shaft is to be rotated in one direction only the provisions of channels, passages, jets, etc. which are active only on reversal of rotation may be omitted. Reference is therefore to be had to the appended claims for a definition of the invention.

What is claimed is:

1. In a lubricating means for thrust bearings, the combination of a thrust collar, means cooperating with the thrust collar for removing oil therefrom and distributing the same to the bearing surfaces, cooling means, and separate means cooperating with said thrust collar for maintaining a separate circulation of oil through said cooling means from that flowing to and from said bearing surfaces.

2. In a lubricating means for thrust bearings, the combination of a thrust collar, means cooperating with the thrust collar for removing oil therefrom and distributing the same to the bearing surfaces, cooling means, and means cooperating with a different portion of said thrust collar from said distributing means for maintaining a separate circulation of oil through said cooling means from that flowing to and from said bearing surfaces.

3. In a lubricating means for thrust bearings, the combination of a thrust collar, means cooperating with the thrust collar for removing oil therefrom and distributing the same to the bearing surfaces, cooling means, and means cooperating with said thrust collar for circulating oil through said cooling means as a separate circulation from the circulation maintained by said distributing means, said distributing means including jets disposed adjacent the bearing surfaces and means cooperating with said thrust collar for forcing oil to said jets.

4. In a lubricating means for thrust bearings, the combination of a thrust collar, means cooperating with the thrust collar for removing oil therefrom and distributing the same to the bearing surfaces thereof, said means also operating to force oil to one or more radial bearings, cooling means, and means cooperating with said thrust collar for maintaining circulation of oil through said cooling means as a separate circulation from the circulation effected by said distributing means.

5. In a lubricating means for thrust bearings, the combination of a thrust collar, means cooperating with the thrust collar for removing oil therefrom and distributing the same to the bearing surfaces, jets disposed adjacent said bearing surfaces, and means cooperating with said thrust collar for forcing oil under pressure to said jets independently of the action of said distributing means.

6. In a lubricating means for thrust bearings, the combination of a thrust collar, means cooperating with the thrust collar for removing oil therefrom and distributing the same to the bearing surfaces, cooling means, means cooperating with said thrust collar to force oil through said cooling means, jets disposed adjacent the thrust bearing surfaces, and means cooperating with said thrust collar for forcing oil under pressure to said jets independently of the action of said distributing means and of the circulation through said cooling means.

7. In a lubricating means for thrust bearings, the combination of a thrust collar, means cooperating with the thrust collar for removing oil therefrom and distributing the same to the bearing surfaces, and means cooperating with the periphery of said thrust collar for removing oil from the cavities containing the bearing surfaces to maintain the same substantially free of oil except for that wetting the bearing surfaces.

8. In a lubricating means for thrust bearings, the combination of a thrust collar, means cooperating with the thrust collar for removing oil therefrom and distributing the same to the bearing surfaces, cooling means, means cooperating with said thrust collar to circulate oil through said cooling means separately from the circulation effected by said distributing means, and means cooperating with said thrust collar to maintain the cavities containing the bearing surfaces substantially free from oil except for the oil wetting the bearing surfaces.

9. In a lubricating means for thrust bearings, the combination of a thrust collar, jets disposed adjacent the bearing surfaces, means cooperating with said thrust collar to force oil to said jets, and means cooperating with said thrust collar to maintain the cavities containing the bearing surfaces substantially free of oil except for the oil wetting the bearing surfaces.

10. In a lubricating means for thrust bearings, in combination with a thrust collar, oil circulating means cooperating with said thrust collar, said circulating means having separate channels with which the surface of said thrust collar cooperates to constitute viscosity pumps, and cooling means having its inlet and outlet connected with relatively opposite ends of different channels whereby oil is forced both to and from said cooling means.

11. In a lubricating means for thrust bearings, in combination wtih a thrust collar, oil circulating means cooperating with said thrust collar, said circulating means having separate channels cooperating with the surface of said thrust collar to constitute viscosity pumps, and cooling means having its inlet and outlet connected to relatively opposite ends of different channels, said channels having inlet and outlet openings which upon reversal of rotation respectively become the outlet and the inlet openings for said channels.

12. In a lubricating means for thrust bearings, in combination with a thrust collar, oil circulating means cooperating with said thrust collar, said circulating means having channels cooperating with the surface of said thrust collar to constitute a pair of viscosity pumps, said channels having apertures at the relatively opposite ends thereof so that oil will be drawn in through one end and discharged through the other end, and cooling means connected to relatively opposite ends of said channels whereby oil is forced through both to force oil into and out of said cooling means.

13. In a lubricating means for thrust bearings, in combination with a thrust collar and an oil reservoir, oil circulating means cooperating with said thrust collar, said circulating means including separate channels cooperating with the surface of said thrust collar to constitute viscosity pumps, and cooling means having its inlet and outlet respectively connected to said channels, each of said channels having an aperture communicating with said reservoir whereby one of said channels operates by suction and the other by elevated pressure to circulate oil through said cooling means for either direction of rotation.

14. In a lubricating means for thrust bearings, in combination with a thrust collar, oil circulating means cooperating with said thrust collar, said circulating means including a channel cooperating with the surface of the thrust collar to constitute a viscosity pump, jets disposed adjacent the bearing surfaces, and connections from said channel to said jets whereby said viscosity pump forces oil under pressure to said jets.

15. In a lubricating means for thrust bearings, in combination with a thrust collar, oil circulating means cooperating with said thrust collar, said circulating means including channels cooperating with the surface of said thrust collar to constitute viscosity pumps, said channels having inlets at the relatively opposite ends thereof so that each of said channels operates for one direction of rotation, jets disposed adjacent the bearing surfaces, and passages leading from the respective channels to said jets whereby oil is forced under pressure to said jets from one or the other of said channels for each direction of rotation.

16. In a lubricating means for thrust bearings, in combination with a thrust collar, oil circulating means cooperating with said thrust collar, said circulating means including two pairs of channels cooperating with the surface of said thrust collar to constitute viscosity pumps and respectively having inlet apertures at relatively opposite ends thereof and respectively having outlet apertures at the opposite ends from said inlet apertures, jets disposed adjacent the bearing surfaces and distributed with respect thereto for each direction of rotation, passages leading from the respective outlet apertures of one pair of channels to respective sets of jets whereby oil is forced under pressure to one set of jets for each direction of rotation, and cooling means connected to one aperture of each of the other pair of channels.

17. In a lubricating means for thrust bearings, in combination with a thrust collar and an oil reservoir, oil circulating means cooperating with said thrust collar, said circulating means including channels cooperating with the surface of said thrust collar to constitute viscosity pumps, inlets for the respective channels adapted to withdraw oil from the cavities containing the bearing surfaces and outlets for the respective channels adapted to deliver oil to the oil reservoir above the level of the oil therein.

18. In a lubricating means for thrust bearings, in combination with a thrust collar and an oil reservoir, oil circulating means cooperating with said thrust collar, said circulating means including one or more channels cooperating with the surface of said thrust collar to constitute viscosity pumps, inlets for the respective channels adapted to withdraw oil from the cavities containing the bearing surfaces and outlets for the respective channels adapted to deliver oil to the oil reservoir above the level of the oil therein, said circulating means also including one or more other channels cooperating with the surface of said thrust collar to constitute viscosity pumps, and cooling means connected with said last named channels.

19. In a lubricating means for thrust bearings, in combination with a thrust collar and an oil reservoir, oil circulating means cooperating with said thrust collar, said circulating means including one or more channels cooperating with the surface of said thrust collar to constitute viscosity pumps, inlets for the respective channels adapted to withdraw oil from the cavities containing the bearing surfaces and outlets for the respective channels adapted to deliver oil to the oil reservoir above the level of the oil therein, said circulating means also including one or more other channels cooperating with said thrust collar to constitute viscosity pumps, and jets disposed adjacent the bearing surfaces and connected to said last named channels.

20. In a lubricating means for thrust bearings, in combination with a thrust collar and an oil reservoir, oil circulating means cooperating with said thrust collar, said circulating means including a channel cooperating with the surface of said thrust collar to constitute a viscosity pump, means providing a sump adjacent the lowermost portion of the thrust collar, an inlet for said channel communicating with said sump, and an outlet for said channel communicating with the oil reservoir above the level of the oil therein whereby said circulating means cooperates with said thrust collar to remove oil from the cavities containing the bearing surfaces substantially as rapidly as it collects in said sump.

21. In a lubricating means for thrust bearings, in combination with a thrust collar, oil circulating means cooperating with said thrust collar, said circulating means including circumferentially extending channels at opposite faces of said thrust collar, each of said channels having an intermediate dam and outlets at each side of said dam, the inlets of said channels being open to receive oil from the surface of said thrust collar whereby said channels collect oil from both faces of said thrust collar for either direction of rotation.

22. In a lubricating means for thrust bearings, in combination with a thrust collar, circulating means cooperating with said thrust collar and including an arcuate member adapted to cooperate with the periphery of said thrust collar, and resilient means for normally urging said circulating means into contact with said thrust collar, said circulating means including circumferentially disposed channels adapted to cooperate with the surface of said thrust collar to provide viscosity pumps.

23. In a lubricating means for thrust bearings, in combination with a thrust collar, circulating means cooperating with said thrust collar and including an arcuate member adapted to cooperate with the periphery of said thrust collar, said circulating means including circumferentially disposed channels adapted to cooperate with the surface of said thrust collar to provide viscosity pumps, and a cooling means connected at its opposite ends to relatively opposite ends of a pair of said channels whereby said viscosity pump forces oil through said cooling means.

24. In a lubricating means for thrust bearings, in combination with a thrust collar, circulating means cooperating with said thrust collar and including an arcuate member adapted to cooperate with the periphery of said thrust collar, said circulating means including one or more circumferentially disposed channels adapted to cooperate with the surface of said thrust collar to provide viscosity pumps, jets disposed adjacent the bearing surfaces, and connections to said jets leading from said channels whereby oil is forced through from said channels to said jets.

25. In a lubricating means for thrust bearings, in combination with a thrust collar and an oil reservoir, circulating means cooperating with said thrust collar and including an arcuate member adapted to cooperate with the periphery of said thrust collar, said circulating means including a viscosity pump channel having an inlet through which oil is adapted to be drawn as it collects after traversing the bearing surfaces and communicating with an outlet disposed above the level of the oil in the reservoir, whereby the bearing cavity is kept substantially free from oil except for that wetting the bearing surfaces.

26. In a lubricating means for thrust bearings, in combination with a thrust collar, circulating means cooperating with said thrust collar and including an arcuate member adapted to cooperate with the periphery of said thrust collar, said circulating means including pairs of circumferentially extending viscosity pump channels, cooling means connected with the relatively opposite ends of one pair of said channels, jets disposed adjacent the bearing surfaces, and connections from the second pair of channels to said jets.

27. In a lubricating means for thrust bearings, in combination with a thrust collar and an oil reservoir, circulating means cooperating with said thrust collar and including an arcuate member adapted to cooperate with the periphery of said thrust collar, said circulating means including circumferentially extending viscosity pump channels, jets disposed adjacent the surface of said bearing surfaces, connections whereby a channel circulates oil to said jets, and connections whereby another of said channels withdraws oil from the cavities containing the bearing members and delivers it above the level of the oil in the reservoir.

28. In a lubricating means for thrust bearings, in combination with a thrust collar and an oil reservoir, circulating means cooperating with said thrust collar and including an arcuate member adapted to cooperate with the periphery of said thrust collar, said circulating means including circumferentially extending viscosity pump channels, cooling means, connections from a pair of said channels whereby said pair circulates oil through said cooling means, and connections whereby another of said channels withdraws oil from the cavities containing the bearing members and delivers it above the level of the oil in the reservoir.

29. In a lubricating means for thrust bearings, in combination with a thrust collar, circulating means cooperating with said thrust collar and including an arcuate member adapted to cooperate with the periphery of said thrust collar, said circulating means including circumferentially extending viscosity pump channels, cooling means connected with one of said channels whereby rotation of said thrust collar forces oil through said cooling means, jets disposed adjacent the bearing surfaces, connections with another of said channels whereby oil is forced to said jets, and connections with yet another of said channels whereby oil is withdrawn from the cavities containing the bearing surfaces.

30. In a lubricating means for thrust bearings, in combination with a thrust collar, circulating means cooperating with said thrust collar and including an arcuate member adapted to cooperate with the periphery of said thrust collar, said circulating means including circumferentially extending viscosity pump channels, cooling means connected with one of said channels whereby rotation of said thrust collar forces oil through said cooling means, and jets disposed adjacent the bearing surfaces and connected with another of said channels whereby oil is forced to said jets by the rotation of said collar, said circulating means being also provided with means whereby it functions as a distributing means for the oil.

31. In a lubricating means for thrust bearings, in combination with a thrust collar, circulating means cooperating with said thrust collar and including an arcuate member adapted to cooperate with the periphery of said thrust collar, said circulating means including a plurality of circumferentially extending viscosity pump channels, cooling means connected to one of said channels whereby rotation of said thrust collar forces oil through said cooling means, jets disposed adjacent the bearing surfaces and connected to another of said channels whereby oil is forced to said jets by the rotation of said collar, and connections whereby another channel keeps the cavities containing the bearing surfaces substantially 32. In a lubricating means for thrust bearings, in combination with a rotatable thrust collar, a wall embracing said thrust collar closely adjacent thereto to provide therewith a viscosity pump, and means in said wall opposite the edges of the peripheral surface of said thrust collar for predetermining the width of effective surface of said viscosity pump and thereby controlling the amount of lubricant elevated thereby.

33. In a lubricating means for thrust bearings, in combination with a rotatable thrust collar, means cooperating with the periphery of said collar for collecting oil therefrom and conveying the same to points remote therefrom as well as deflecting oil into contact with the bearing surfaces of said collar, said means including a member engaging the periphery of said collar and providing a channel therewith through which oil is forced by the viscosity pumping action of said collar, and passages conveying the oil from said channel to points remote from said bearing.

34. In a lubricating means for thrust bearings, in combination with a rotatable thrust collar, means cooperating with the periphery of said collar for collecting oil therefrom and conveying the same to points remote therefrom as well as deflecting oil into contact with the bearing surfaces of said collar, said means including a member engaging the periphery of said collar and providing a channel therewith through which oil is forced by the viscosity pumping action of said collar, and passages conveying the oil from said channel to points remote from said bearing, said channel decreasing in cross section in the direction of the rotation of said thrust collar whereby said oil is placed under an increasing pressure.

35. In a lubricating means for thrust bearings, in combination with a rotatable thrust collar, means cooperating with the periphery of said collar for collecting oil therefrom and conveying the same to points remote therefrom as well as deflecting oil into contact with the bearing surfaces of said collar, said means including a member engaging the periphery of said collar and providing a channel therewith through which oil is forced by the viscosity pumping action of said collar, and passages conveying the oil from said channel to points remote from said bearing, said means having an inlet which is smaller than the volume of oil carried by the periphery of said collar whereby a part of the oil carried by the periphery of said collar is deflected laterally at said inlet to wet the surfaces of said collar.

36. In a lubricating means for thrust bearings, in combination with a rotatable thrust collar, means cooperating with the periphery of said collar for collecting oil therefrom and conveying the same to points remote therefrom as well as deflecting oil into contact with the bearing surfaces of said collar, said means including a channel-shaped member resiliently held in contact with the periphery of said collar and having an oil collecting edge for removing oil from said periphery, and passages leading from said oil collecting edge to points remote from said bearing.

37. In a lubricating means for thrust bearings, in combination with a rotatable thrust collar, means cooperating with the periphery of said collar for collecting oil therefrom and conveying the same to points remote therefrom as well as deflecting oil into contact with the bearing surfaces of said collar, said means including a member cooperating with the periphery of said collar, said member having a channel of decreasing cross section and an oil collecting edge at the extremity of said channel, and passages communicating with said channel whereby oil in said channel is deflected by said edge and caused to flow through said passages to points remote from said bearing.

38. In a lubricating means for thrust bearings, in combination with a rotatable thrust collar, means cooperating with the periphery of said collar for collecting oil therefrom and conveying the same to points remote therefrom as well as deflecting oil into contact with the bearing surfaces of said collar, said means including a channel-shaped member cooperating with the periphery of said collar to constitute a viscosity pump, passages leading from said channel to one or more journal bearings, cooling means, and oil circulating means cooperating with another portion of said thrust collar for circulating oil to and from said cooling means.

39. In a lubricating means for thrust bearings, in combination with a rotatable thrust collar, means cooperating with the periphery of said collar for collecting oil therefrom and conveying the same to points remote therefrom, said means including a channel-shaped member cooperating with the periphery of said thrust collar to constitute a viscosity pump, a jet disposed adjacent the bearing surfaces, and passages leading from said channel-shaped member to said jet.

40. In a lubricating means for thrust bearings, in combination with a rotatable thrust collar, means cooperating with the periphery of said collar for collecting oil therefrom and conveying the same to points remote therefrom, said means including a channel-shaped member cooperating with the periphery of said thrust collar to constitute a viscosity pump, a jet disposed adjacent the bearing surfaces, passages leading from said channel-shaped member to said jet, cooling means, and oil circulating means cooperating with another portion of the periphery of said collar for conveying oil to and from said cooling means.

41. In a lubricating means for thrust bearings, in combination with a rotatable thrust collar and an oil reservoir, means cooperating with the periphery of said collar to constitute a viscosity pump, oil circulating means cooperating with the periphery of said collar, and cooling means connected with said oil circulating means, said circulating means withdrawing oil from the oil reservoir and delivering the same to said viscosity pump, and one or more outlet apertures in the wall of said pump whereby the excess oil delivered by said circulating means may escape and said circulating means thereby maintain the cavities containing the bearing surfaces substantially free from oil except for that wetting said bearing surfaces.

42. In a lubricating means for thrust bearings, in combination with a thrust collar, an arcuate member engaging the periphery of said collar, resilient means for normally urging said arcuate member into contact with said thrust collar, channels in the inner face of said member whereby the periphery of said collar cooperates therewith to constitute a viscosity pump, cooling means, and connections from said channels to the opposite ends of said cooling means whereby oil is forced through said cooling means without flowing to said bearing surfaces.

43. In a lubricating means for thrust bearings, in combination with a thrust collar, an arcuate member engaging the periphery of said collar, resilient means for normally urging said arcuate member into contact with said thrust collar, channels in the inner face of said member whereby the periphery of said collar cooperates therewith to constitute a viscosity pump, cooling means, connections from said channels to the opposite ends of said cooling means whereby oil is forced through said cooling means without flowing to said bearing surfaces, a wall closely surrounding the periphery of said thrust collar and providing an annular space to which the cooled oil is delivered as it is drawn from said cooling means and in which said oil is elevated by the rotation of said thrust collar, and an oil distributing means cooperating with the periphery of said thrust collar for distributing oil to the bearing surfaces.

44. In a lubricating means for thrust bearings, in combination with a thrust collar, an arcuate member engaging the periphery of said collar, resilient means for normally urging said arcuate member into contact with said thrust collar, channels in the inner face of said member whereby the periphery of said collar cooperates therewith to constitute a viscosity pump, cooling means, connections from said channels to the opposite ends of said cooling means whereby oil is forced through said cooling means without flowing to said bearing surfaces, a wall closely surrounding the periphery of said thrust collar and providing an annular space to which the cooled oil is delivered as it is drawn from said cooling means and in which said oil is elevated by the rotation of said thrust collar, oil distributing means cooperating with the periphery of said thrust collar to collect oil under pressure, and passages leading therefrom for conveying the collected oil to one or more jets for distributing oil to the bearing surfaces.

45. In a radial bearing, in combination with a shaft, a radial bearing member cooperating with said shaft, and means for lubricating the relatively rotatable bearing surfaces between said shaft and member including a collar rotatable with said shaft, a member channel-shaped in cross section engaging the periphery of said collar, means for collecting oil from the periphery of said collar as it is conveyed thereto through said channel, and resilient means for urging said member into contact with the periphery of said collar to prevent admission of air between the lateral extremities of said member and the periphery of said collar.

46. In a radial bearing, in combination with a shaft, a radial bearing member cooperating with said shaft, and means for lubricating the relatively rotatable bearing surfaces between said shaft and member including a collar rotatable with said shaft, a member channel-shaped in cross section cooperating with the periphery of said collar, said member providing with the periphery of said collar a passage which converges in the direction of rotation of the periphery of said collar, and means for collecting oil from the periphery of said collar as it is conveyed thereto through said channel.

47. In a combined radial and thrust bearing, in combination with a shaft, a thrust collar thereon, a radial bearing cooperating with said shaft, a thrust bearing cooperating with the face of said collar, means for lubricating said bearings including an arcuate member of channel-shaped cross section providing a passage for oil between the periphery of said collar and said member, and means for resiliently urging said channel-shaped member into sealing contact with the periphery of said collar.

48. In a combined radial and thrust bearing, in combination with a shaft, a thrust collar thereon, a radial bearing cooperating with said shaft, a thrust bearing cooperating with the face of said collar, and means for lubricating said bearings including a member channel-shaped in cross section cooperating with the periphery of said collar, means carried by said member for removing part of the oil from the periphery of said collar and directing the same to said radial bearing, and means for removing the remainder of the oil from the periphery of said collar and directing the same to said thrust bearing.

HARRY A. S. HOWARTH.